(No Model.)

E. F. PFLUEGER.
ARTIFICIAL FISH BAIT.

No. 284,056. Patented Aug. 28, 1883.

Witnesses:
J. Henry Kaiser
F. L. Bonnel

Inventor:
Ernest F. Pflueger
By
Wm. Crull Intire
Atty.

UNITED STATES PATENT OFFICE.

ERNEST F. PFLUEGER, OF AKRON, OHIO.

ARTIFICIAL FISH-BAIT.

SPECIFICATION forming part of Letters Patent No. 284,056, dated August 28, 1883.

Application filed June 21, 1883. (No model.)

*To all whom it may concern:*

Be it known that I, ERNEST F. PFLUEGER, a citizen of the United States, residing at Akron, Ohio, have invented new and useful Improvements in Artificial Fish-Bait, of which the following is a specification.

My invention relates to certain new and useful improvements in artificial fish-baits, and particularly to that class in which a gaudy, brilliant, or rapidly-moving object is used to attract the fish.

It is well known that large voracious fish lie secluded during the day, and seek food as it becomes dark, at which time my improved bait is designed for use.

I am aware that the broad idea of a luminous fish-bait is not new, and do not wish to lay claim to any such broad idea, my invention consisting in the particular features of construction and ornamentation hereinafter fully explained and specifically claimed.

Figure 1:
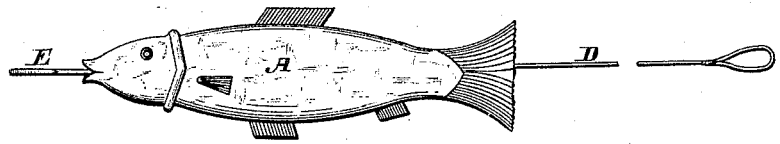
Figure 2:
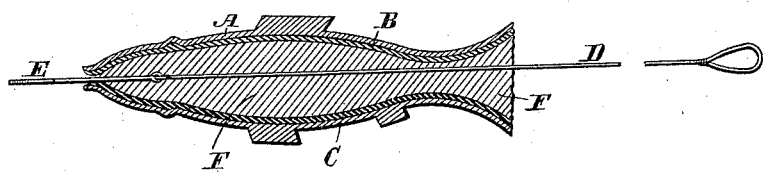
Figure 3:
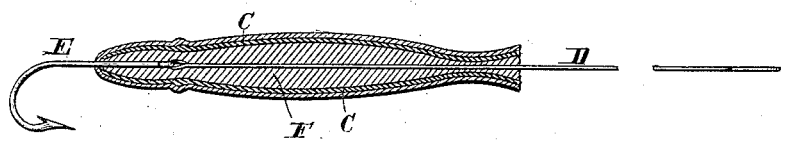

In the accompanying drawings, Figure 1 is a side elevation of a bait embodying the features of my invention; Fig. 2, a central longitudinal section of the same, and Fig. 3 a transverse longitudinal section.

Similar letters indicate like parts in the several figures of the drawings.

A represents a minnow made of malleable glass. On the upper half of the interior surface is deposited silver or gold fluid, B, to produce a highly reflective appearance, and the lower half of the interior surface I coat with any suitable luminous compound, either self-luminous, as phosphoric compounds, or luminous by an inherent retentive power. The substance which I prefer to employ is a paint composed of sulphide of calcium and a drying oil or varnish; but any other phosphorescent material or compound may be used. I pass through the interior of the minnow a snood, D, to which the hook E is attached, the hook and snood pass longitudinally through the bait, and are held in position, and the interior coated surfaces of the minnows protected by a filling of cement or other suitable material, F, which also gives the proper weight or buoyancy to the bait.

I do not wish to lay claim, broadly, to the idea of a luminous fish-bait, as that has already been secured to me by Letters Patent No. 272,317; but What I do claim, and desire to secure by Letters Patent, is—

As a new article of manufacture, an artificial fish-bait composed of hollow glass, having the upper half of its interior surface coated with silver or gold fluid to produce a highly reflective surface, the lower half of the interior surface coated with a luminous compound or paint, and a centrally-arranged hook-snood, the whole protected by a filling of cement or other suitable material, substantially as and for the purposes set forth.

In testimony whereof I have hereunto set my hand in the presence of two subscribing witnesses.

ERNEST F. PFLUEGER.

Witnesses:
FRANK M. ATTERHOLT,
ADAM YERRICK.